Figure 1:
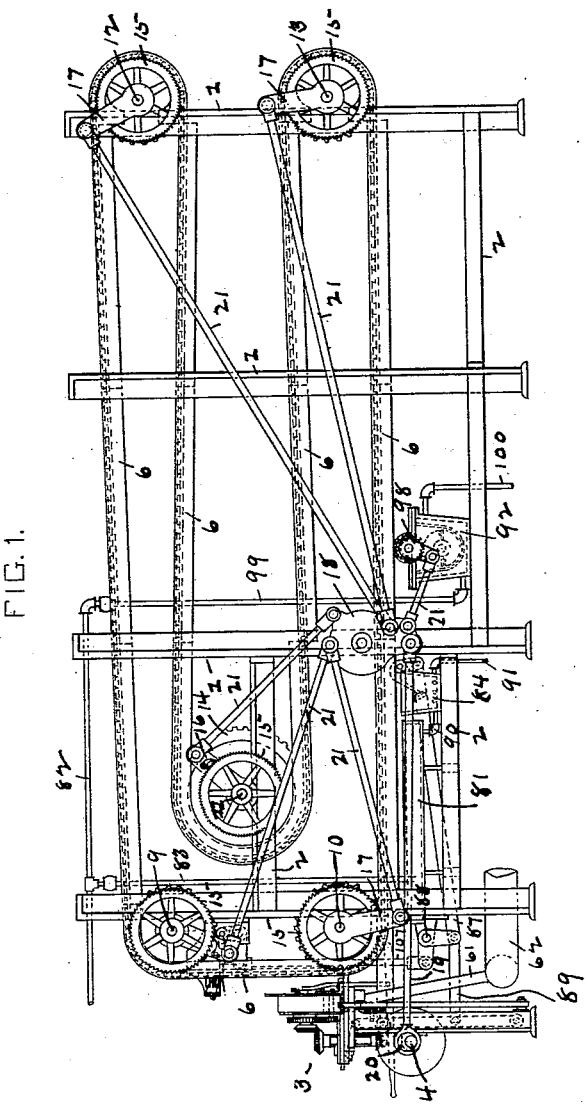

(No Model.)

W. W. ABBOTT.
MATCH MACHINE.

No. 573,802.

13 Sheets—Sheet 1.

Patented Dec. 22, 1896.

Witnesses
Edward C. Phoenix
J. E. Chapman

Inventor
Wm. W. Abbott
By Wm. J. Chapman
Attorney (No Model.)  13 Sheets—Sheet 2.

W. W. ABBOTT.
MATCH MACHINE.

No. 573,802.  Patented Dec. 22, 1896.

Witnesses
Edward C. Phoenix
J. E. Chapman

Inventor
Wm. W. Abbott
By Wm. J. Chapman
Attorney (No Model.)  13 Sheets—Sheet 3.
W. W. ABBOTT.
MATCH MACHINE.

No. 573,802. Patented Dec. 22, 1896.

Witnesses.
Edward C. Phoenix
J. E. Chapman

Inventor.
Wm. W. Abbott
By Wm. J. Chapman
Attorney.

(No Model.)

13 Sheets—Sheet 4.

W. W. ABBOTT.
MATCH MACHINE.

No. 573,802.

Patented Dec. 22, 1896.

Witnesses
Edward C. Phoenix
J. E. Chapman

Inventor
Wm. W. Abbott
By Wm. J. Chapman
Attorney (No Model.) 13 Sheets—Sheet 5.
W. W. ABBOTT.
MATCH MACHINE.

No. 573,802. Patented Dec. 22, 1896.

Witnesses.
Edward C. Phoenix
J. E. Chapman

Inventor.
Wm. W. Abbott
By Wm. J. Chapman
Attorney.

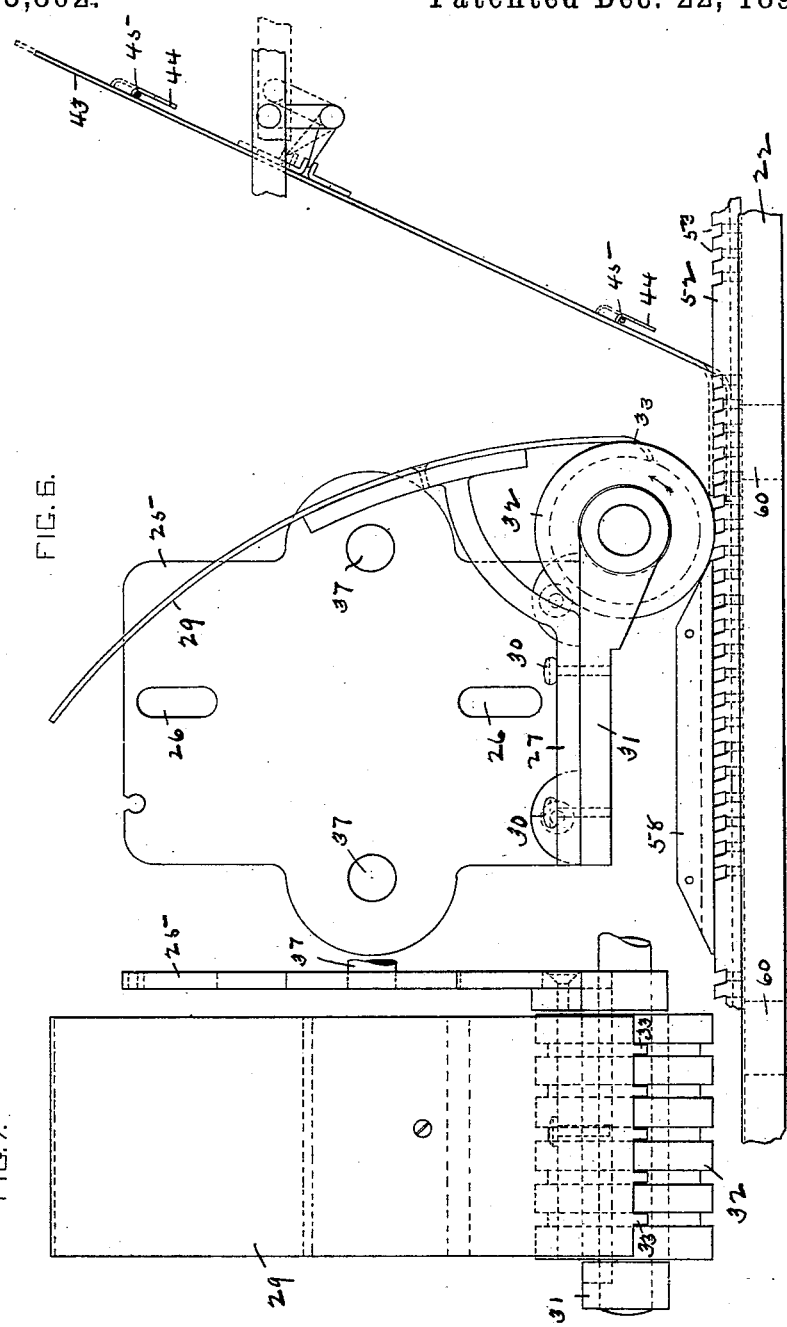

(No Model.)  W. W. ABBOTT.  13 Sheets—Sheet 7.
MATCH MACHINE.
No. 573,802.  Patented Dec. 22, 1896.
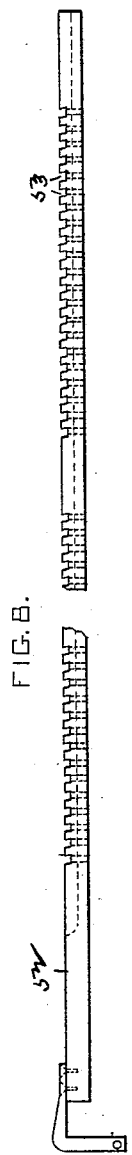
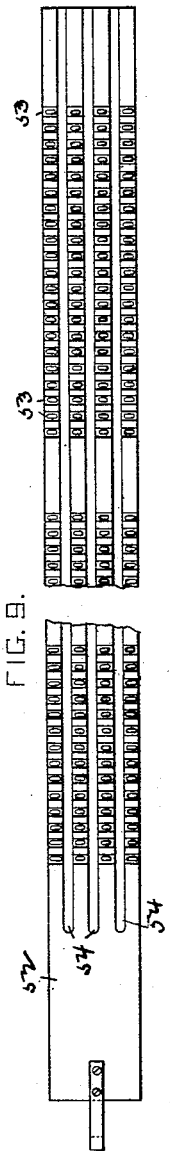
Witnesses.
Edward C. Phoenix
J. E. Chapman
Inventor.
Wm. W. Abbott
By Wm. T. Chapman
Attorney.

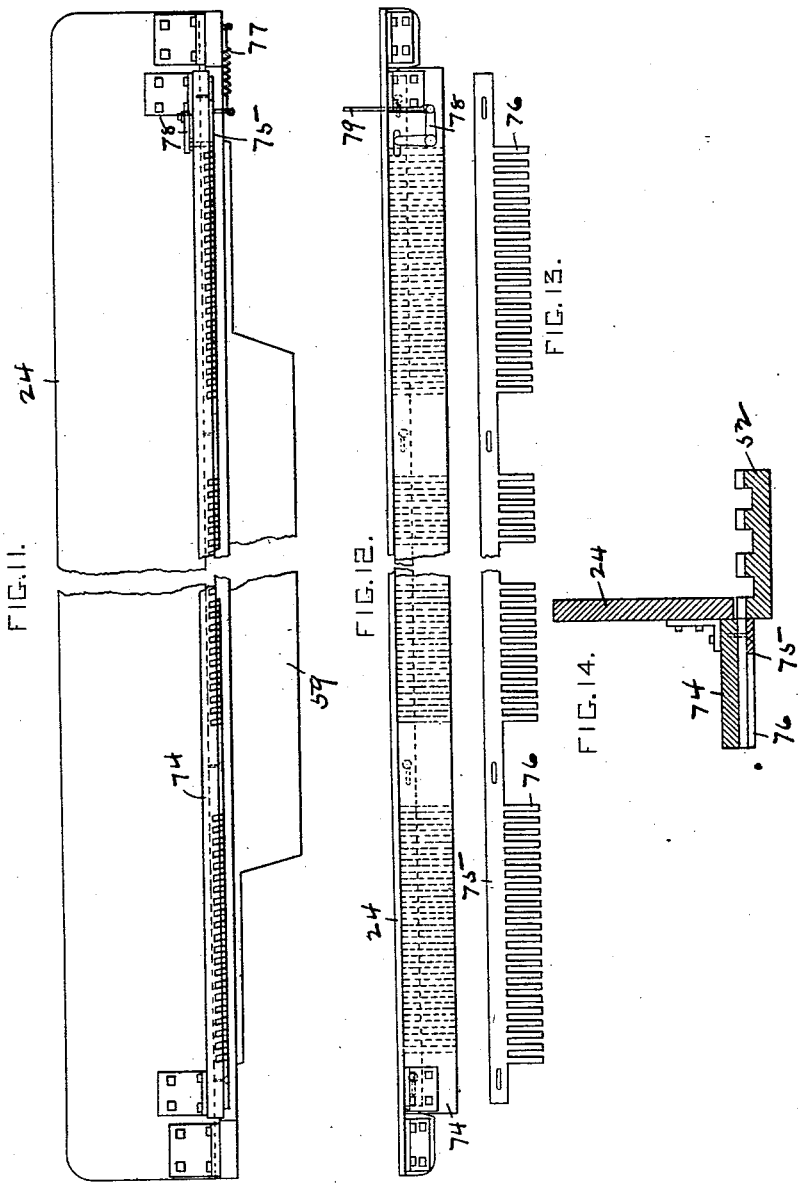

(No Model.) 13 Sheets—Sheet 9.

W. W. ABBOTT.
MATCH MACHINE.

No. 573,802. Patented Dec. 22, 1896.

Witnesses.
Edward L. Phoenix
J. E. Chapman

Inventor.
Wm. W. Abbott
By J. E. Chapman
Attorney.

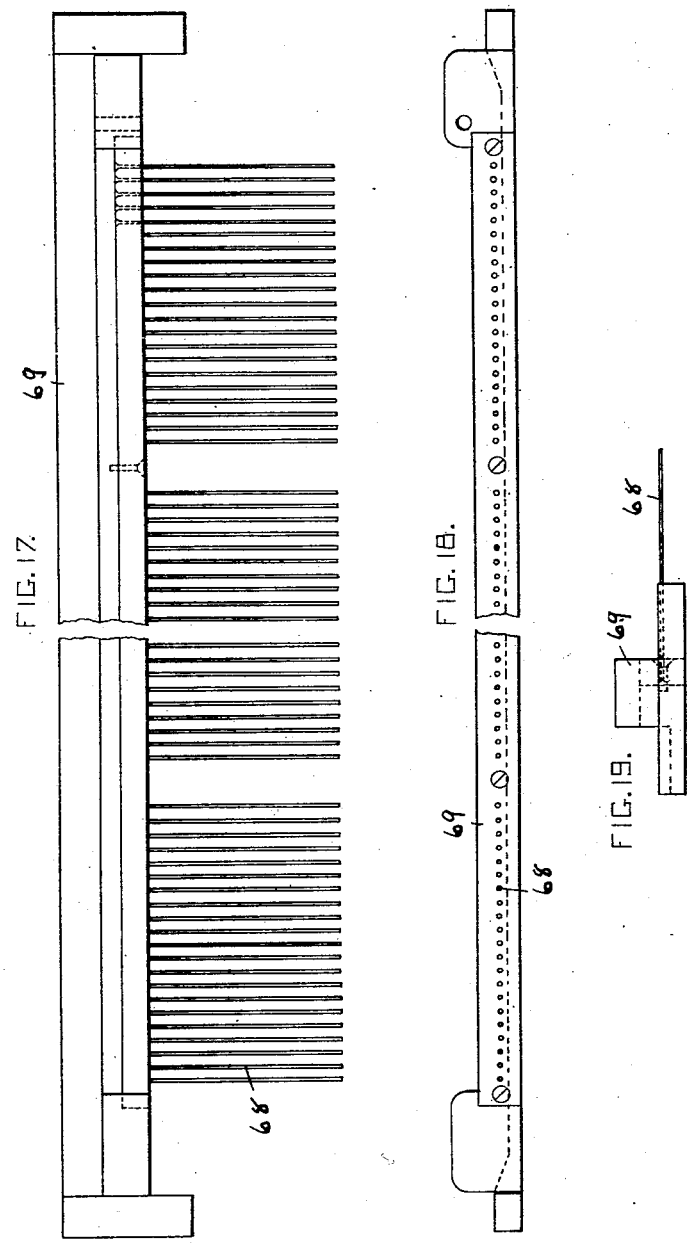

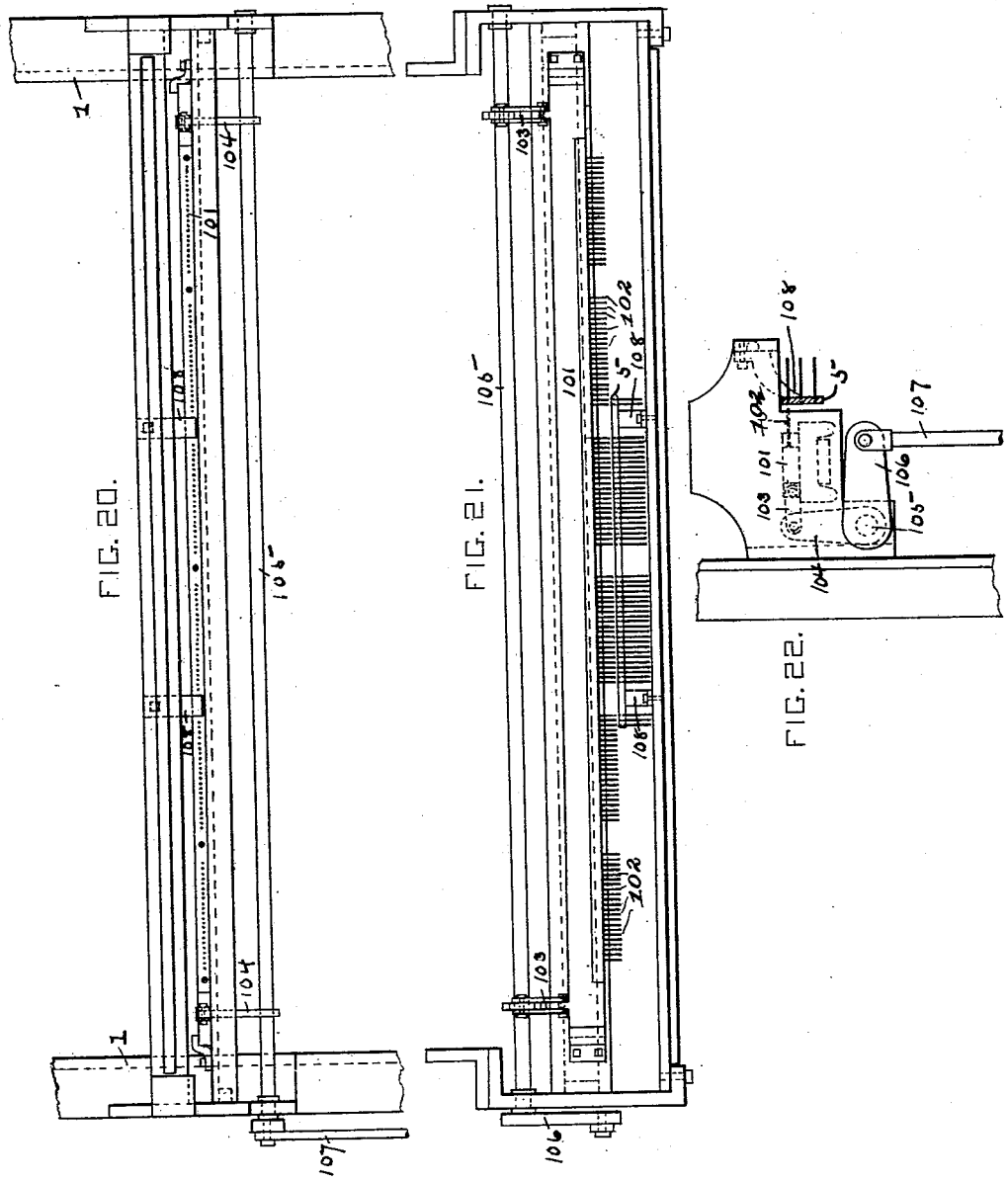

(No Model.)   13 Sheets—Sheet 12.
W. W. ABBOTT.
MATCH MACHINE.
No. 573,802.   Patented Dec. 22, 1896.
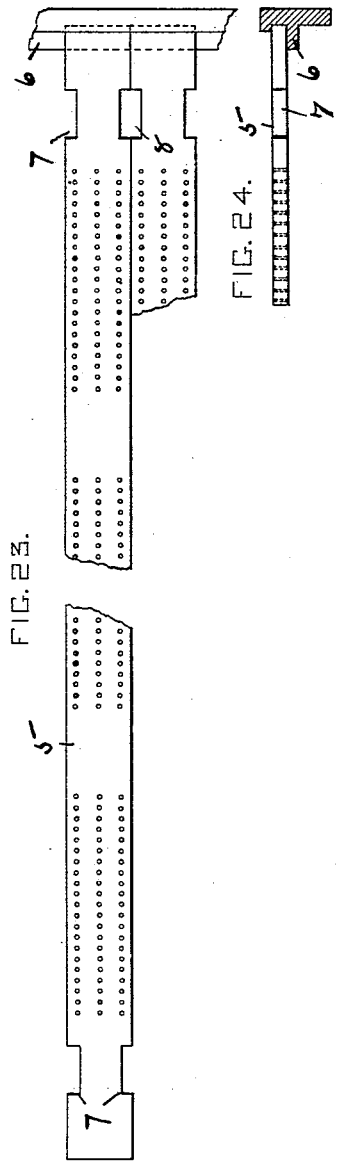
Witnesses.
Edward C. Phoenix
J. E. Chapman
Inventor,
Wm. W. Abbott
By Wm. J. Chapman
Attorney.

(No Model.) 13 Sheets—Sheet 13.
W. W. ABBOTT.
MATCH MACHINE.
No. 573,802. Patented Dec. 22, 1896.
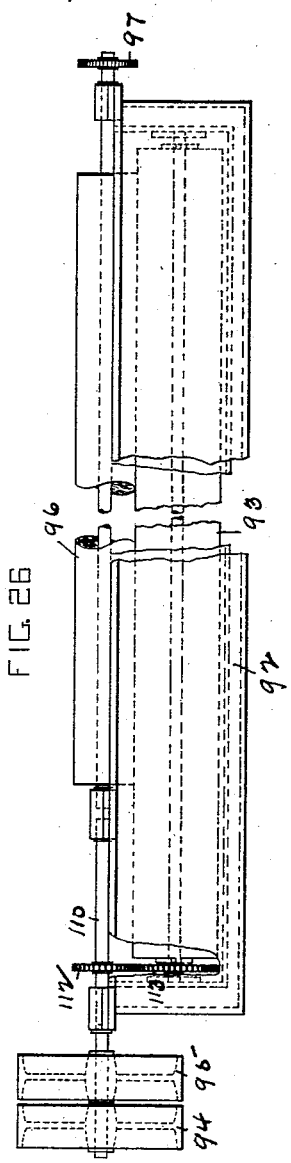
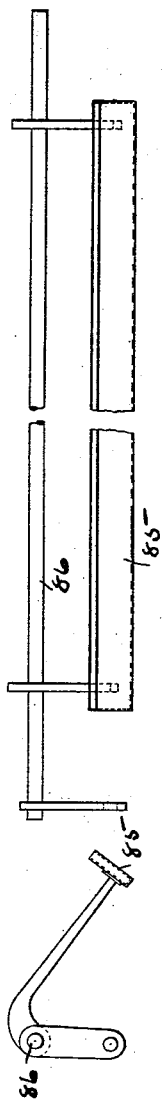
Witnesses.
Edward C. Phoenix.
J. E. Chapman.
Inventor.
Wm. W. Abbott
By Wm. J. Chapman
Attorney.

UNITED STATES PATENT OFFICE.

WILLIAM W. ABBOTT, OF NEW HAVEN, CONNECTICUT.

MATCH-MACHINE.

SPECIFICATION forming part of Letters Patent No. 573,802, dated December 22, 1896.

Application filed August 27, 1894. Serial No. 521,393. (No model.)

*To all whom it may concern:*

Be it known that I, WILLIAM W. ABBOTT, a citizen of the United States, residing at New Haven, county of New Haven, and State of Connecticut, have invented certain new and useful Improvements in Match-Machines, of which the following is a specification, reference being had to the accompanying drawings, forming part thereof.

My invention relates to machines for making matches, and especially to that type of such machinery in which the match-sticks, having been previously cut from the block, are applied to the machine in a mass, from which the individual sticks are automatically separated and are then secured to a carrier which conducts them to the devices by which paraffin and the composition are successively applied to their projecting ends, after which they are carried by said carrier through a sufficient space to dry them to the point where they are discharged from the carrier.

The objects of the invention are to provide novel and simplified means for performing the several operations in such a machine, with a view to lessening the cost of manufacture of the machine itself and at the same time increase the efficiency and working capacity thereof.

To these ends my invention consists in the match-machine embodying the construction, combination, and arrangement of parts, substantially as hereinafter described, and as particularly pointed out in the claims.

Figure 2:
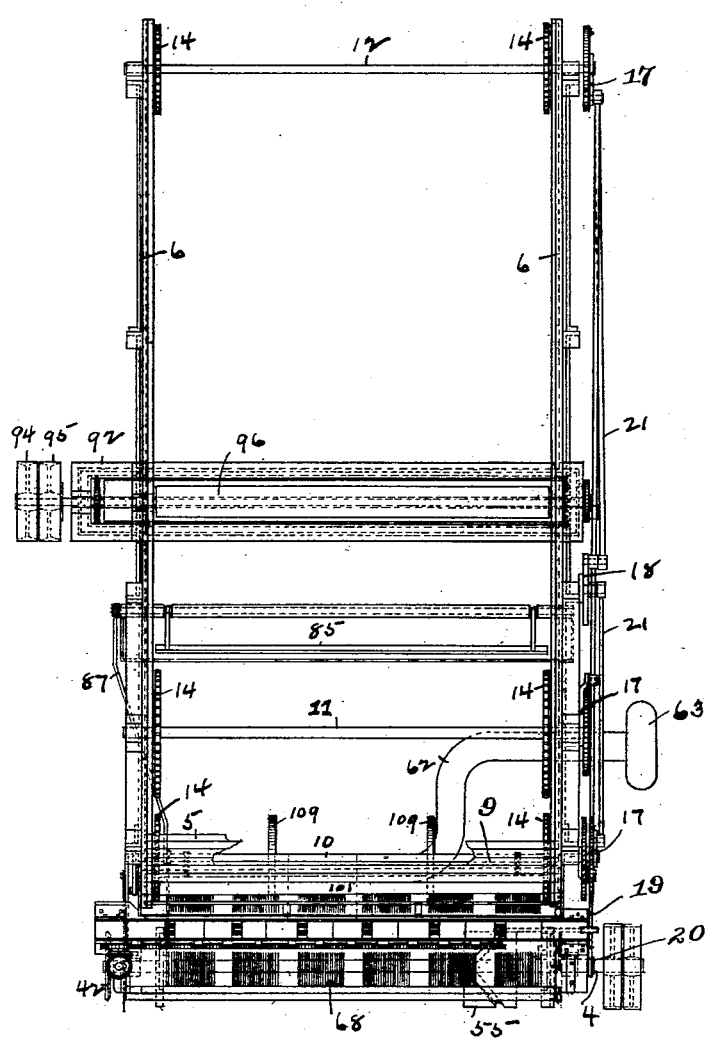
Figure 3:
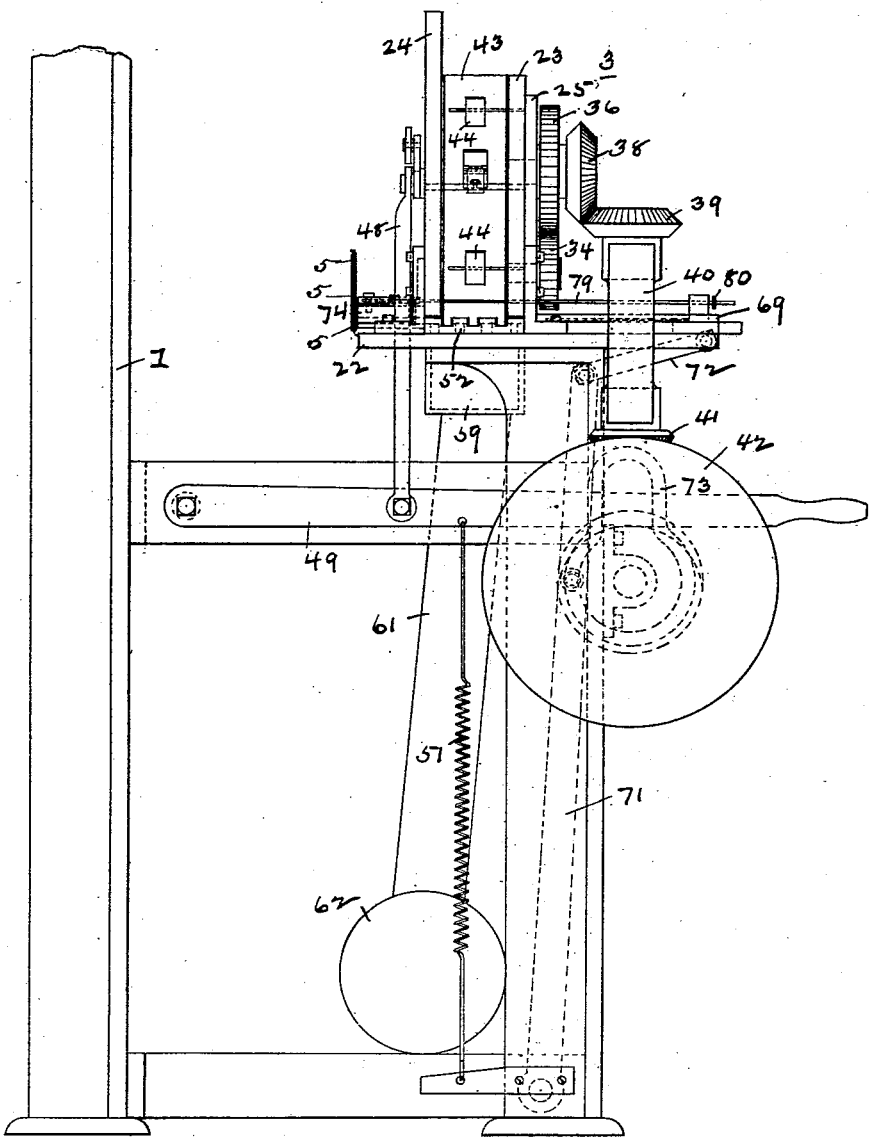
Figure 4:
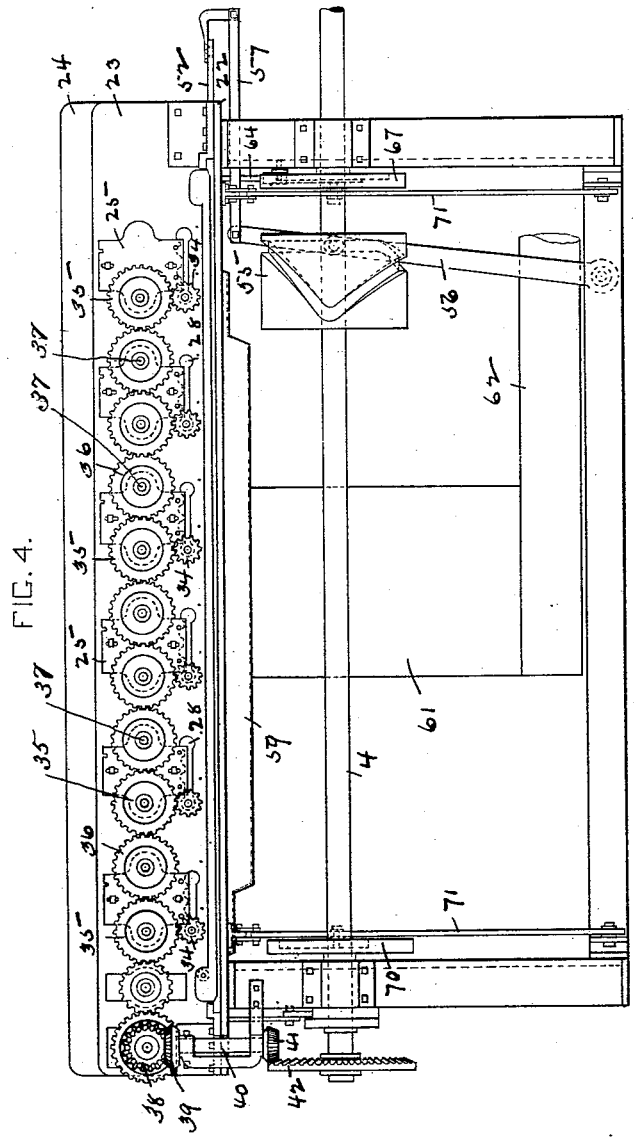
Figure 5:
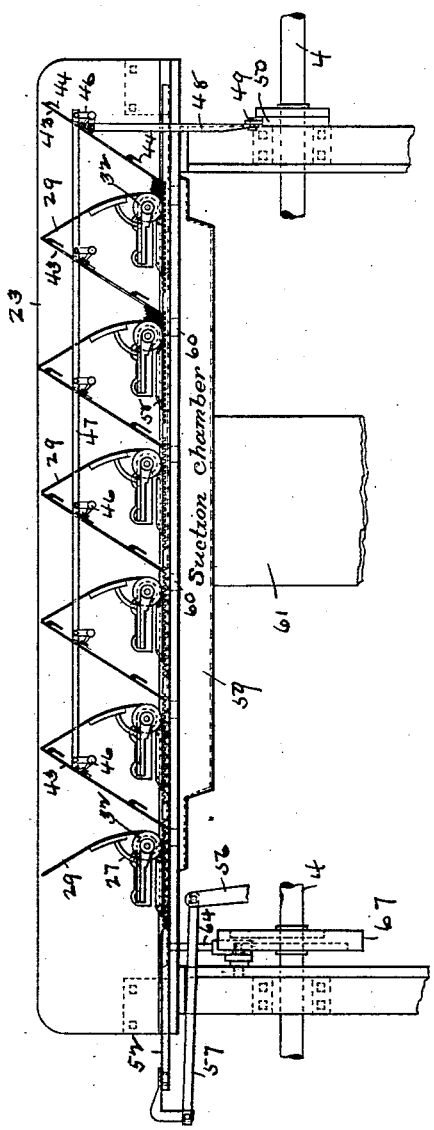
Figure 15:
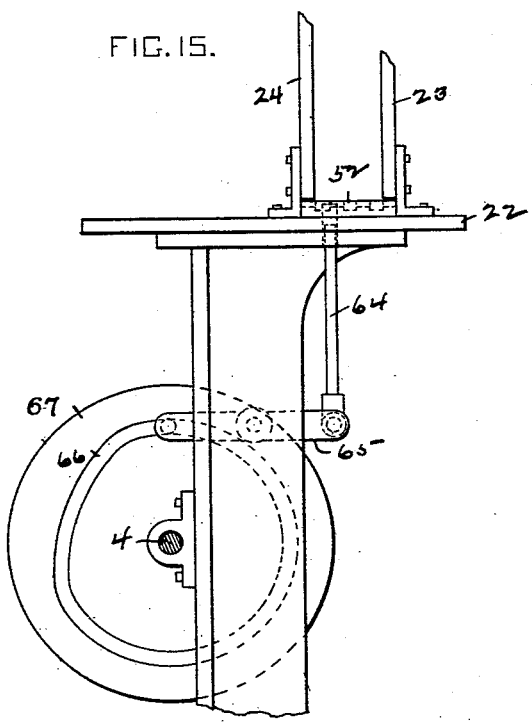
Figure 16:
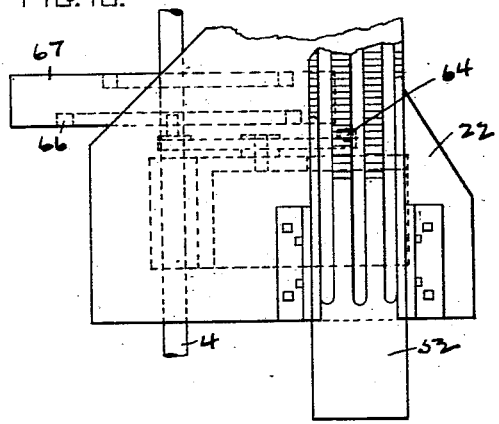

Referring to the drawings, in which like numerals designate like parts in the several views, Figure 1 is a side elevation of a match-machine embodying the invention. Fig. 2 is a plan view thereof, most of the carrier-plates being omitted. Fig. 3 is a side elevation, drawn to a larger scale and looking toward the left in Fig. 2, of the head of the machine, which contains the mechanism for separating the match-sticks and applying them to the carrier. Fig. 4 is a front end view of the machine. Fig. 5 is an elevation of the inner side of the head of the machine or the side opposite to that shown in Fig. 4 with the rear ends of the hoppers removed. Fig. 6 is an enlarged detail view of one of the hoppers to receive the match-sticks and a portion of the separator-plate. Fig. 7 is an inside view of one side of said hopper. Figs. 8, 9, and 10 are respectively a side view, a plan, and an end view of the separator-plate, the same being broken centrally to reduce its length in the drawing. Fig. 11 is an inner side view of a portion of the machine-head, showing the plate containing the stick-guiding grooves and the sliding bottom plate for the latter. Fig. 12 is a plan view thereof. Fig. 13 is a plan view of said bottom plate. Fig. 14 is a cross-section of the parts shown in Fig. 11. Fig. 15 is a detail view of the stop for temporarily locking the separator-plate against movement and its actuating means. Fig. 16 is a partial plan view of said separator-plate and said stop. Figs. 17, 18, and 19 are respectively a plan, a side view, and an end view of the punches which force the match-sticks into engagement with the carrier and their supporting-bar. Figs. 20, 21, and 22 are respectively a front view, a plan, and an end view of the means for discharging the matches from the carrier. Fig. 23 is a plan view of portions of two of the independent perforated plates composing the carrier. Fig. 24 is an edge view of a portion of one of said plates and a cross-section of one of the continuous ways by which the ends thereof are guided. Fig. 25 is a plan, side, and front view of the means for applying paraffin to the match-sticks. Fig. 25ª is an end view thereof. Fig. 26 is a front view, partly broken away, of the means for applying the composition to said sticks.

Referring to Fig. 1, the numeral 1 designates the vertical portions, and 2 the horizontal portions, of the frame of the machine, which will be of suitable strength to afford a rigid support for the moving parts and of sufficient length to secure the necessary drying action of the matches in their traverse of said frame, with the carriers, between the points where they receive the composition and where they are discharged. At the front end of said frame is the machine-head 3, containing the stick-separating mechanism and the means for applying the sticks to the carrier, the particular construction of which mechanism and means will be presently described. Suitably journaled in said head is the main driving-shaft 4, from which most of the moving parts of the machine receive their motion and which is itself driven by belt connection with a power-shaft in the ordinary manner.

The carrier is composed of a series of independent plates 5, which plates at their ends are movably supported in ways 6, (see Figs. 23 and 24,) located at opposite sides of the frame in such manner as to be retained within said ways, while being free to slide longitudinally of the latter. Said ways 6 are parallel with each other throughout their length and extend from a point near the top of the frame downwardly in a vertical line immediately at the rear of the head 3 to a point nearly on a level with the driving-shaft 4, thence rearwardly in a substantially horizontal line to the rear end of the machine, thence upwardly and then forwardly nearly to the front end of the machine, thence upwardly and then rearwardly again to the rear end of the machine, and thence upwardly and forwardly again back to the starting-point, thereby forming a continuous track for the guidance of the plates 5. The particular back-and-forth arrangement of said ways herein shown has been devised with a view to securing a sufficient length of traverse of the carrier to dry the matches within a minimum amount of floor-space, and it will be understood that I do not limit myself to the particular arrangement thereof shown, so far as the portion thereof utilized for drying purposes simply is concerned. Each of the plates 5 is provided with recesses 7 near each end and upon the opposite sides thereof, which recesses, together with those in the adjoining plates, form openings 8 (see Fig. 23) to receive the teeth of the gear-wheels by which motion is imparted to the plates upon their ways and which are located as follows: Concentrically disposed within each of the curves described by the ways 6 is a shaft extending transversely across the frame, said shafts being numbered, respectively, 9, 10, 11, 12, and 13. (See Fig. 1.) Each of said shafts carries two gear-wheels 14, the teeth of which are adapted to enter the openings 8 of said series of plates at the opposite ends of the latter. Each of said shafts also carries at one end thereof a ratchet-wheel 15, the teeth of which are engaged by a pawl 16, carried by a lever 17, movable about the shaft as a center in such manner as to impart positive movement to the shaft in one direction.

A rocker-lever 18, suitably hung upon the frame, has connected to its lower end an eccentric-rod 19, operated by an eccentric 20 on the driving-shaft 4 in such manner as to impart a rocking movement to said lever, and connecting-rods 21 connect said rocker-lever with each of the pawl-levers 17, whereby the latter receive a vibratory movement from the former, said connecting-rods being so joined to said rocker-lever relatively to its center of motion as to cause the pawls carried by said pawl-levers to actuate the shafts 9, 10, 12, and 13 in the same direction and the shaft 11 in the opposite direction, as will be apparent from an inspection of Fig. 1. Provision is thus made for imparting an intermittent motion to the plates composing the carrier from the continuously-revolving driving-shaft 4 and the various operations of applying the match-sticks to said carrier, treating them with paraffin and with composition, and discharging them from the carrier are performed during the pauses in the movement of the latter, as will be hereinafter described.

It will be understood from the foregoing description that the plates 5 extend throughout the entire length of the continuous ways 6, making contact with each other at their edges, and thereby form practically an endless carrier, while at the same time each plate is wholly independent of the others so far as there being any connection between them is concerned. I thus avoid the use of endless chains to carry said plates and greatly simplify and cheapen the cost of manufacture of the carrier without impairing its efficiency. Each of the plates 5 is provided with a series of perforations, preferably made slightly flaring at each end to receive the butt-ends of the match-sticks, and I have herein shown said perforations as being arranged in groups of three rows each extending longitudinally of the plate, (see Fig. 23,) the distance between said rows being the distance traveled by the plate at each of its intermittent movements.

Turning now to the means for separating the match-sticks from a mass and inserting their butt-ends within the perforations in the carrier-plates and referring especially to Figs. 3 to 6, inclusive, the head 3 of the machine is provided with a horizontal table 22, located above the plane of the driving-shaft 4, and upon said table are erected two standards 23 24, which extend from end to end of the table parallel with each other and form the front and rear ends of the hoppers in which the match-sticks are placed in bulk. To the front side of the standard 23 are secured a series of plates 25 by means of bolts passing through vertical slots 26 in said plates, (see Figs. 6 and 7,) whereby they are rendered capable of a limited vertical adjustment. To said plates 25 are bolted bracket-pieces 27, which project rearwardly through openings 28 in the standard. To said bracket-pieces are secured between the two standards the curved strips 29, which form one of the sides of the series of hoppers, and also, by means of bolts 30, the journal-blocks 31, in each of which is journaled a roll 32, preferably composed of soft rubber, which rolls are grooved circumferentially, as shown in Fig. 7, to receive outwardly-bent fingers 33 on the strips 29. The arbors of said rolls 32 project through the openings in the standard 23 and carry at their front end a spur-gear 34, and motion is imparted to said series of gears 34 in the same direction through the train of larger gears 35 and intermediate idler-gears 36, (see Fig. 4,) mounted on studs 37, projecting from the plates 25, the first gear of said train being mounted on a short shaft carrying a bevel-gear 38, Figs. 3 and 4, which meshes with a similar gear 39 on a vertical shaft 40, carrying at its lower end a bevel-gear 41, which meshes with the large bevel-gear 42 on the driving-shaft 4. The rolls 32 are thus positively driven in the direction indicated by the arrow in Fig. 6, and can be adjusted vertically to compensate for wear by means of the vertical adjustment of the plates 25, as described. The sides of the hoppers opposite to the strips 29 are formed by strips 43, which stand at a suitable angle to the strips 29 to afford room for a considerable supply of match-sticks between them and forming a converging throat between said strips at their lower end. The strips 43 are provided upon their outer side with loops 44, which embrace pins 45, projecting from the rear side of standard 23 in such manner as to permit the strips to have a slight upward and downward movement on said pins, and such movement is automatically imparted thereto through the series of elbow-levers 46, a rod 47 connecting said levers with each other, a vertical rod 48 connecting the first elbow-lever to a lever 49, (see Fig. 3,) a cam 50 on the driving-shaft 4, which actuates said lever 49 in one direction, and a spring 51, which actuates it in the opposite direction, the lever 49 being preferably extended beyond its cam and provided with a handle at its front end, as shown, whereby it can also be operated manually at any time. At its lower end each of the strips 43 is provided with a horizontally-projecting three-pronged foot, which foot, when the strip occupies its elevated position, as shown by broken lines in Fig. 6, engages the adjacent roll 32 and closes the throat of the hopper to prevent the escape of the match-sticks therefrom. The separator-plate 52 rests upon the table 22 beneath the series of hoppers, said plate being provided at its upper side with the transverse grooves 53 to receive the match-sticks and with the longitudinal grooves 54 to receive the prongs of the feet on the strips 43 when the latter occupy their depressed position, as shown by full lines in Fig. 6, and thereby cause said prongs to lie below the level of the bottom of the grooves 53. Said separator-plate is also provided with a series of perforations extending from the bottom of the grooves 53 through the plate (see Figs. 8, 9, and 10) to permit a suction of air to be created through the plate, as will be presently described. The grooves 53 are arranged in groups to correspond with the groups of perforations in the carrier-plates 5, previously described, with which they exactly register when the separator-plate and one of said carrier-plates are in position for loading the latter with match-sticks.

An intermittent longitudinal movement is imparted to the separator-plate from a cam 55 on driving-shaft 4 through a lever 56 and a connecting-rod 57, (see Figs. 4 and 5,) whereby each group of the grooves 53 in said plate is caused to pass in one direction beneath the throat of its hopper and then to return to its former position. When said separator-plate moves toward the right in Figs. 5 and 6, the strips 43 are raised to their highest position, in which they prevent the escape of any sticks from the hoppers, as before stated. As soon as the separator-plate reaches the end of such movement to the right the strips 43 drop to their lowest position, and as the said plate moves in the opposite direction, or toward the left, the match-sticks drop into the grooves 53 one by one, so that when the plate reaches its normal position again each groove contains a stick. Such operation of filling the grooves in the separator-plate with sticks is greatly facilitated by the action of the revolving rolls 32, which brush back the surplus sticks and insure the even laying of the individual sticks in the grooves, while the projection of the bent fingers 33 of the strips 29 into the circumferential grooves in said rolls, before described, effectually prevents any of the sticks from being carried upwardly by the rolls to clog the latter. A series of stationary cover-plates 58, secured to the standard 23 between the hoppers, serve to close the grooves 53 in the separator-plate when the latter stands in its normal position and thereby retain the sticks within said grooves when they are acted upon by the punches, as will be soon described.

To still further facilitate the passage of the sticks from the hoppers into the grooves in the separator-plate, I provide means for creating a suction of air through the table 22 immediately beneath the throat of each hopper, said means consisting of an air-chamber 59, secured to the under side of the table, Figs. 4 and 5, from which chamber openings 60 lead through the table beneath the hoppers, and pipes 61 62, leading from said chamber to an exhaust-pump 63, Fig. 2. The suction created by said pump being exerted through the holes in the bottom of the grooves 53 in the separator-plate upon the mass of sticks in the series of hoppers effectually prevents any clogging of the sticks in the latter and draws the sticks into said grooves evenly and truly.

To prevent any accidental movement of the separator-plate during the time the punches are operating to force the sticks from the grooves therein, I provide a locking-bolt 64, Fig. 15, guided at its upper end by a hole in the table 22 and adapted to enter a hole in the separator-plate, said bolt at its lower end being connected to a lever 65, having a stud which projects into a cam-groove 66 in the outer face of a cam-wheel 67 on driving-shaft 4, the parts being so timed that said bolt will be operated to lock the separator-plate when it reaches its normal position and to release it just before it begins its next movement.

The series of punches 68, which I will herein call the "loading-punches," are secured at their front ends to a head 69, Figs. 17, 18, and 19, which head is suitably guided for movement upon the table 22 toward and away from the separator-plate. An intermittent movement is given to said head from the cam-wheels 67 and 70 on shaft 4, through levers 71 and links 72, (see Figs. 3 and 4,) said levers carrying studs which project into the grooves 73 in the inner faces of said cam-wheels. The punches are arranged in groups to correspond with those of the grooves in the separator-plate, with which they actually register when said plate occupies its normal position. Said punches are made of hardened steel, and their function is to force the match-sticks from the grooves in the separator-plate into the perforations in the plates 5 of the carrier, when a row of said perforations is brought into register with the grooves in said plate by the intermittent movement of the carrier. To accurately guide the sticks in such passage from the separator-plate to the carrier-plate and insure their proper entry into the perforations the latter, I secure to the rear side of the standard 24 a guide-plate 74, (see Figs. 3, 11, and 14,) having in the under side thereof grooves corresponding to those in the separator-plate and which register with the latter when the separator-plate occupies its normal position. To the under side of said guide-plate is secured in such manner as to be capable of a slight movement transversely of the machine a bottom plate 75, Fig. 13, having a series of projecting tongues 76, the width of which as well as the distance between them corresponds to the width of the grooves in the guide-plate, whereby said bottom plate is adapted in one of its positions to form, by its tongues 76, a bottom to all of the grooves in the guide-plate, and in its other position to leave said grooves open at the bottom to permit free egress downwardly of the sticks with the carrier-plate, into which they have been inserted. The very slight movement of the bottom plate necessary to secure this result is produced in one direction by a spring 77, Fig. 11, and in the opposite direction by an elbow-lever 78 on the guide-plate 74, which is connected at one end to the bottom plate through a slot in the guide-plate, and a rod 79, connected to the opposite end of said lever, which rod projects through a hole in a portion of the punch-carrying head 69 and carries a tappet 80, (see Fig. 3,) which is struck by said head in its receding movement to operate said rod and lever and move the bottom plate to the position in which it covers the bottom of the grooves in the guide-plate. By means of such connections as soon as the head 69 begins its movement toward the separator-plate the spring 77 moves the bottom plate to close the lower sides of the grooves in the guide-plate, thereby causing said grooves to truly guide the match-sticks into the perforations in the carrier-plate, and when the head 69 recedes it moves said bottom plate to open the grooves in the guide-plate, so that with the next downward movement of the carrier-plate the sticks carried thereby are free to move downwardly out of the grooves in said guide-plate. All danger of breaking the match-sticks is thus obviated and their proper insertion in the carrier-plates insured in a very simple manner.

Each carrier-plate is thus supplied successively with three rows of match-sticks, and by the continued intermittent movements of the carrier said sticks are carried first over a steam-chamber 81, (see Fig. 1,) by which the sticks are heated to adapt them to readily take the paraffin, said steam-chamber being supplied with steam from any suitable source through a supply-pipe 82 and branch pipe 83, or any equivalent means for thus heating the sticks can be employed. The sticks are next carried over the paraffin-vat 84, and during one of the pauses of the carrier a dipper 85 (see Figs. 1 and 25) rises from the body of paraffin in said vat and immerses the ends of an entire row of sticks in the paraffin therein, said dipper being connected to a rock-shaft 86, to an arm of which is connected a rod 87, which is connected at its opposite end to an arm of a rock-shaft 88, to which a rocking movement is transmitted from one of the levers 71 through a connecting-rod 89. The dipper is thus caused to descend and take up a fresh supply of paraffin with each intermittent movement of the carrier. A pipe 90, leading from the steam-chamber 81 to a coil in the vat 84, supplies the necessary amount of heat to the paraffin in said vat, and a pipe 91 conducts away the exhaust-steam. The match-sticks are next carried over the composition-vat 92, Figs. 1 and 26, containing an agitator 93, driven by the shaft 110, which carries the fast and loose pulleys 94 95, (see Fig. 2,) through the gears 112 113, by which a continuous revolving movement is transmitted thereto by belt from the power-shaft. On said vat above said agitator is mounted the feed-roll 96, the shaft of which carries a ratchet-wheel 97, which is operated by a pawl-lever 98, connected by a rod 21 with rocker-lever 18, the function of which roll is to take up a supply of the composition and apply it to the ends of the match-sticks in a well-known manner. A branch pipe 99 from the supply-pipe 82 supplies steam to the steam-jacket of said vat 92, and a pipe 100 conducts away the exhaust in the usual manner, whereby the composition is maintained at the proper temperature. The sticks are now carried by the step-by-step movement of the carrier around the shafts 13, 11, 12, and 9, successively, being properly dried in such transit, and are finally brought to the discharging mechanism located just below the shaft 9, and which is constructed as follows: A head 101 (see Figs. 20, 21, and 22) is supported upon the frame in such manner as to be capable of a limited horizontal movement, said head carrying the series of discharging-punches 102, similar in their construction and arrangement to the loading-punches before described. Said head 101 is connected by links 103 to two arms 104 of a rock-shaft 105, and a third arm 106 on said shaft is connected by a rod 107 with an arm on the rock-shaft 88, as shown in Fig. 1. An exact timing of the movements of the head 101 with those of the head 69 is thus secured, whereby an entire row of sticks is inserted in the carrier and another row discharged therefrom during each pause of the carrier between its intermittent movements.

In Fig. 21 a portion of one of the carrier-plates is shown, with the discharging-punches about to advance to discharge the matches therefrom, the latter falling into any suitable receptacle placed in position to receive them. To prevent lateral deflection of the carrier-plates when the discharging-punches advance, I locate stops 108 on the frame in position to bear against the outer side of said plate between the groups of matches when it is in alinement with the punches. Wheels 109 on shaft 10 (see Fig. 2) perform the same function in connection with the loading-punches, by bearing against the inner side of the plate.

The machine thus constructed is comparatively simple in the number and arrangement of its parts, and not liable to get out of working order. All of its movements being taken from a single driving-shaft, perfect timing in the operation of the various parts is secured and the machine is rendered capable of operation with a minimum amount of power.

It will be apparent that various modifications in the separate details of construction herein shown and described can be made within the spirit of the invention.

Having thus fully described my invention, what I claim, and desire to secure by Letters Patent, is—

1. In a match-machine, two parallel, continuous ways, a series of wholly independent, match-holding plates movably supported at their ends upon said ways and making contact with each other at their side edges, said plates being provided with recesses in their said side edges, and a shaft carrying a toothed wheel the teeth of which are adapted to successively enter the recesses in said plates to cause a progressive movement of the latter upon said ways, combined and operating substantially as and for the purpose set forth.

2. In a match-machine, the combination with the parallel, continuous ways, and the series of independent carrier-plates mounted upon said ways, of a series of shafts located adjacent to said ways and adapted to impart movement to said plates upon the latter, pawl-and-ratchet mechanisms connected with each of said shafts for operating the same in one direction, a main driving-shaft, and intermediate crank connections substantially as described between the latter and each of said pawl-and-ratchet mechanisms, whereby said series of plate-moving shafts are operated in unison, for the purpose set forth.

3. In a match-machine, the combination with the endless ways, the carrier-plates mounted on said ways, the series of shafts for moving said plates, and the ratchet-wheels and pawl-carrying levers for operating said shafts, of the rocker-lever, rods connecting the same with each of said pawl-carrying levers, the main driving-shaft, and intermediate connections, as the eccentric and eccentric-rod shown and described, between the latter shaft and said rocker-lever.

4. In a match-machine, the combination with a series of perforated carrier-plates and a series of loading-punches arranged and operating substantially as described, of a series of hoppers to receive match-sticks in bulk, of a separator-plate movably supported beneath said hoppers and containing a series of grooves or depressions for holding single sticks, means for intermittently causing a to-and-fro movement of said plate, and means for preventing the descent of the sticks from said hoppers during the movement of said plate in one direction, substantially as and for the purpose described.

5. The combination of the series of hoppers having one fixed side and one vertically-movable side provided with a laterally-projecting foot, of the grooved separator-plate, means for periodically imparting a back-and-forth movement to said plate, and means substantially as described for raising the movable sides of said hoppers to their highest position during the movement of said plate in one direction, substantially as and for the purpose set forth.

6. The combination with the series of hoppers having one side thereof provided with outwardly-bent fingers at their lower end, of the series of rolls provided with circumferential grooves to receive said fingers, the grooved separator-plate and means for intermittently imparting a back-and-forth movement to the latter, substantially as described.

7. The combination with the series of hoppers having the movable side provided with the laterally-projecting foot, of the separator-plate provided with the transverse grooves to receive the match-sticks and recessed longitudinally to receive the feet on said hoppers and means for imparting an intermittent back-and-forth movement to said plate, and means for imparting a simultaneous intermittent movement to the movable sides of said hoppers, substantially as set forth.

8. The combination, in a match-machine, of a series of hoppers for holding match-sticks in bulk, with a separator-plate movably supported beneath said hoppers and provided with grooves for holding single sticks and with openings leading from said grooves through the bottom of said plate, means for imparting to said plate an intermittent reciprocatory movement, and means substantially as described for creating an air-suction through the openings in said plate, for the purpose set forth.

9. In a match-machine, the combination with a table having at the under side thereof an air-chamber and provided with a series of openings communicating with said chamber, of a series of hoppers located directly over the openings in said table, a separator-plate movably supported upon said table beneath said hoppers, said plate being provided with transverse grooves for holding match-sticks and with openings leading from the bottom of said grooves to the lower side of said plate, and an exhaust-pump suitably connected with said air-chamber for withdrawing the air therefrom, for the purpose described.

10. The combination with the series of perforated carrier-plates and means for imparting an intermittent movement thereto, of the series of hoppers, the grooved separator-plate and means for causing an intermittent movement thereof, the series of loading-punches and their supporting head, and means substantially as described for imparting an intermittent movement to said head during the periods of rest of said carrier and separator plates, to cause said punches to force a series of match-sticks from the grooves in the separator-plate into the perforations in the carrier-plate.

11. The combination with the grooved separator-plate and the series of loading-punches of the guide-plate provided at its under side with grooves adapted to register with those in said separator-plate, and the bottom plate movable in a horizontal plane and adapted to open and close the grooves in said guide-plate, substantially as and for the purpose set forth.

12. The combination with the grooved separator-plate, the loading-punches, the grooved guide-plate, and the movable bottom plate for the latter, of means substantially as described, whereby said punches are caused by their retrograde movement to actuate said bottom plate to open the grooves in said guide-plate, for the purpose set forth.

13. The combination with the endless ways, the series of independent carrier-plates mounted upon said ways and containing perforations as described, and means for causing an intermittent progressive movement of said plates on said ways, of the series of hoppers for holding match-sticks in bulk, the grooved separator-plate for separating sticks from said bulk, the movable head carrying the series of loading-punches, the head carrying the series of discharging-punches, and means substantially as described for simultaneously moving said punch-carrying heads in opposite directions between the movements of said carrier-plates, substantially as and for the purpose set forth.

14. The combination with the frame of the machine provided with the endless ways 6, of the plates 5 mounted at their ends upon said ways and provided with perforations as described and with the recesses 7, of a series of shafts located adjacent to said ways and carrying toothed wheels to engage the recesses in said plates, and means substantially as described for imparting an intermittent revolving movement to said shafts.

15. The combination with the series of hoppers and the grooved separator-plate 52, of the vertically-adjustable plates 25, carrying the rolls 32, and means, as the main shaft 4 and the intermediate gear connections shown and described, for imparting a revolving movement to said rolls, for the purpose set forth.

16. The combination with the fixed hopper-strips 29, of the movable strips 43, and the levers 46, rods 47 and 48, lever 49, cam 50 on driving-shaft 4, and spring 51, for actuating said strips in both directions, substantially as described.

17. The combination with the series of hoppers and the grooved separator-plate adapted for movement beneath said hoppers, of the series of cover-plates 58 located between said hoppers and adapted to prevent the escape of match-sticks from the separator-plate, substantially as set forth.

WILLIAM W. ABBOTT.

Witnesses:
Wm. H. Chapman,
Geo. W. Thomas.